United States Patent [19]
Stephan

[11] Patent Number: 5,758,920
[45] Date of Patent: Jun. 2, 1998

[54] DASHBOARD FOR A MOTOR VEHICLE

[75] Inventor: Friedrich Stephan, Hemmingen, Germany

[73] Assignee: Dr. Ing. H.C.F. Porsche AG, Germany

[21] Appl. No.: 710,982

[22] Filed: Sep. 25, 1996

[30] Foreign Application Priority Data

Sep. 25, 1995 [DE] Germany ............ 195 35 556.3

[51] Int. Cl.⁶ ............................................. B62D 25/14
[52] U.S. Cl. ........................................................ 296/70
[58] Field of Search .................... 296/70–72, 73, 296/74, 191; 280/778

[56] References Cited

U.S. PATENT DOCUMENTS 3,797,601  3/1974  Barenyi et al. .................. 296/70

5,067,747  11/1991  Yokoyama ........................ 296/70

FOREIGN PATENT DOCUMENTS

3128785 A1  4/1992  Germany.
2 084 522    9/1981  United Kingdom.

OTHER PUBLICATIONS

European Search Report dated Jan. 10, 1997.

Primary Examiner—Jesus D. Sotelo
Attorney, Agent, or Firm—Evenson, McKeown, Edwards, & Lenahan, P.L.L.C.

[57] ABSTRACT

A cover for the dashboard of a motor vehicle is detachably held in place by predetermined breaking points. In the event of a crash, the breaking points shear off, permitting the steering column, together with the cover, to collapse.

9 Claims, 4 Drawing Sheets

DASHBOARD FOR A MOTOR VEHICLE

This invention relates to a dashboard for a motor vehicle with a cover which surrounds the steering wheel column and is held in a cutout of the dashboard.

German patent document DE 31 28 785 A1 discloses a dashboard covering which comprises a penetration section for a steering column which is bounded by predetermined braking points. In the event of a crash, a covering sleeve of the steering column can break open the predetermined breaking points so that the steering wheel is displaced with the covering sleeve into the dashboard.

It is an object of the present invention to provide a dashboard for a motor vehicle which provides an improved arrangement for unhindered displacement of the steering column, together with the steering wheel and surrounding covering parts in the event of a crash, is easy to mount and has constructional units which are easy to replace.

Among other important advantages achieved by dashboard arrangement according to the invention, a cover is fastened in the dashboard such that, in the event of a crash, the steering column with covering parts as well as shifting devices can be displaced without hindrance in the driving direction; also the parts which are disposed upon one another, such as the cover with the covering sleeve and the shifting devices on the steering wheel, cannot block each other.

These and other objects are achieved by the dashboard arrangement according to the invention, in which the cover is held in a section of the dashboard by fastening devices which have predetermined breaking points, preferably on the lower and upper edges of the cutout and the cover. (Additional such breaking points may also be arranged on the side, or they may be arranged only on the side.) The predetermined breaking points of the fastening devices are arranged in shearing planes so that, in the event of pressure exerted on the steering wheel in a crash, the cover detaches at the predetermined breaking points, and is largely freely displaceable.

On the lower edge of the cover, pins are provided which are held between spring clips on the dashboard. This simplifies the mounting considerably, particularly since the upper fastening devices comprise holding legs on the cover which are fixed on the dashboard by means of screws. The shafts of the pins have predetermined breaking points which are placed such that, to the extent possible, no projection will remain in the event of a shearing-off. The predetermined breaking point on the holding angles are designed in the same fashion.

Other objects, advantages and novel features of the present invention will become apparent from the following detailed description of the invention when considered in conjunction with the accompanying drawings.

DETAILED DESCRIPTION OF THE DRAWINGS

Figure 1:
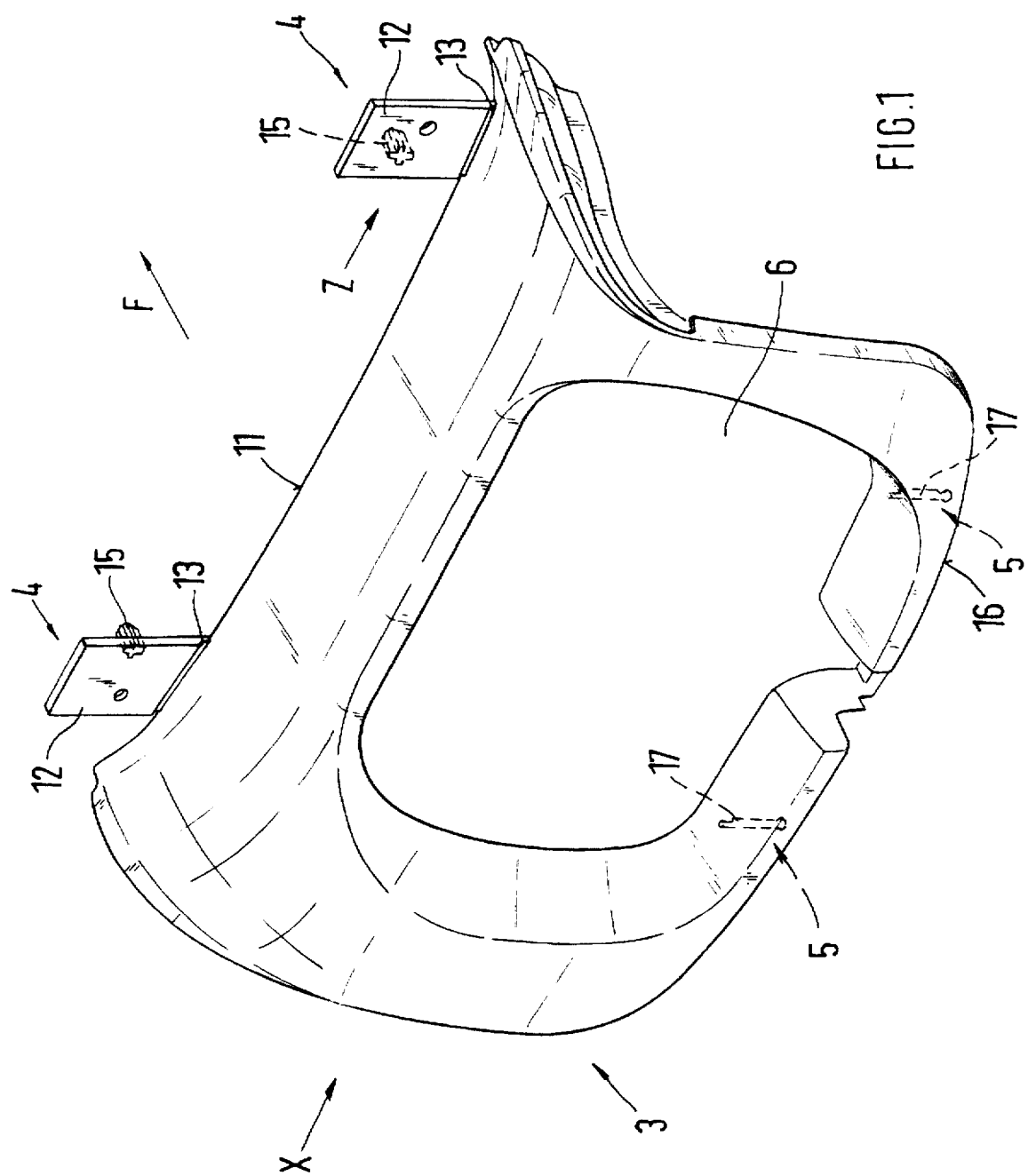
FIG. 1 is a diagrammatic representation of a dashboard cover according to the invention.
Figure 2:
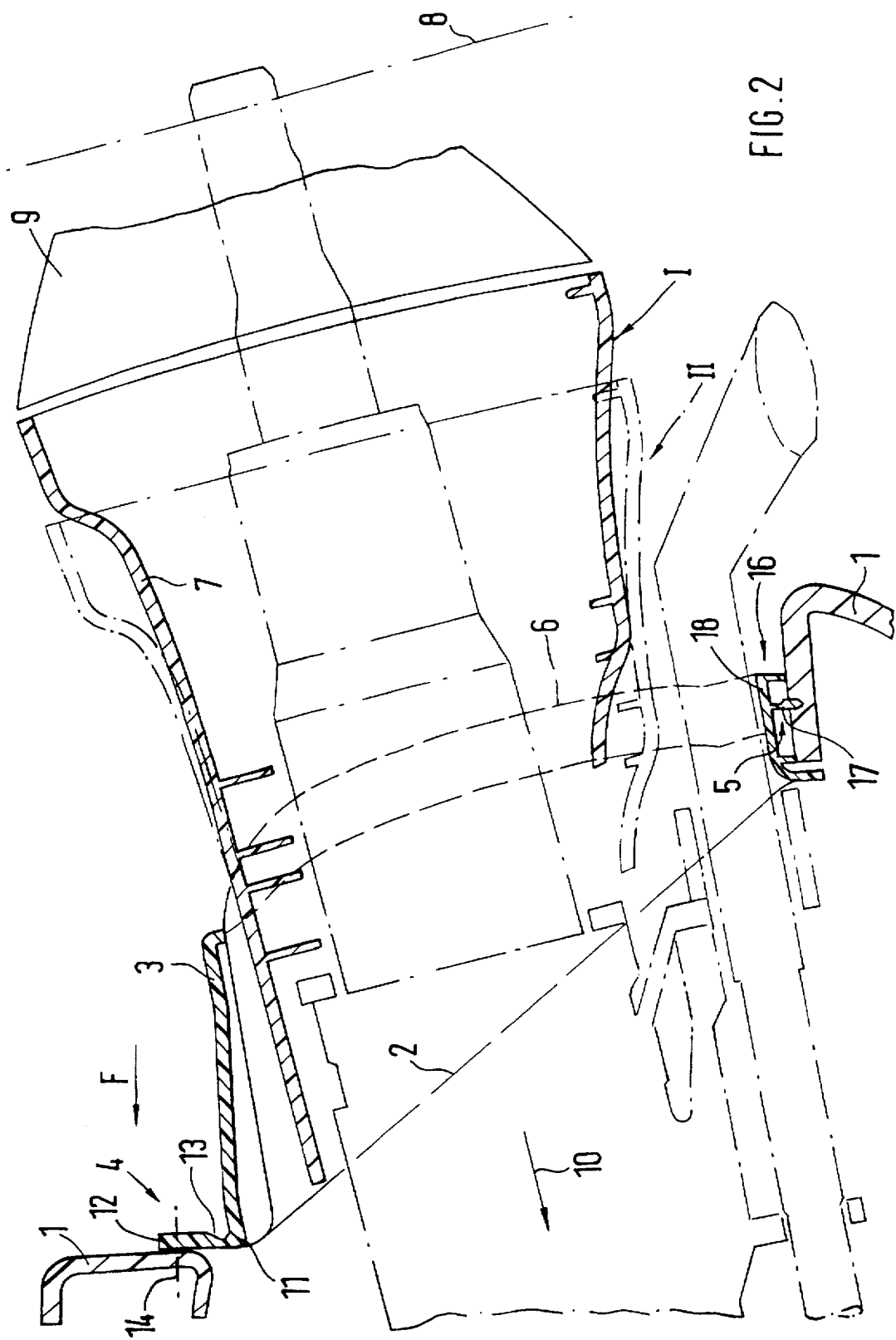
FIG. 2 is a sectional view, along a longitudinal center, of the cover with the adjoining covering sleeve and the steering wheel.
Figure 3:
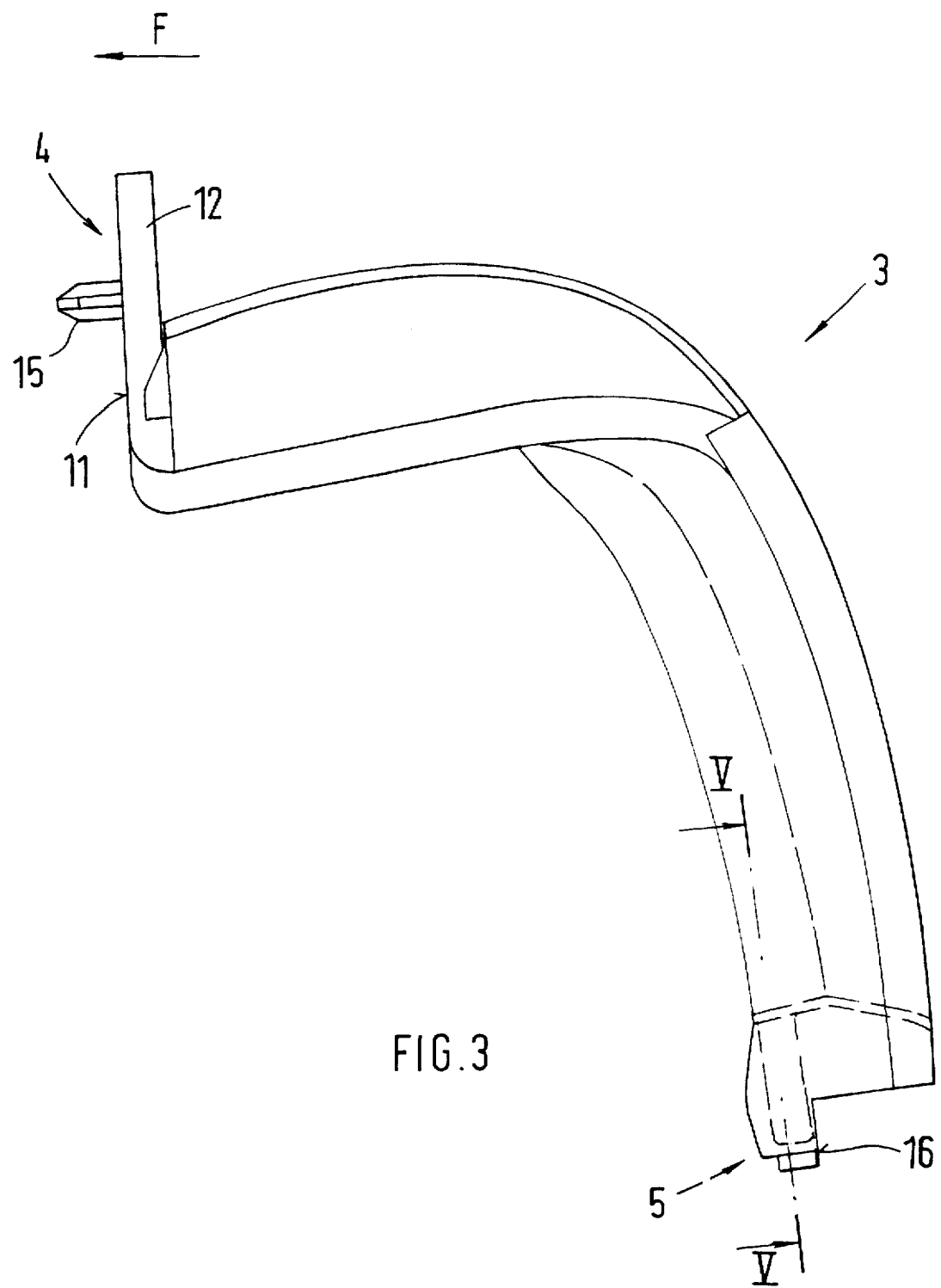
FIG. 3 is an enlarged lateral view of the cover in the direction of the arrow X of FIG. 1.

As shown in FIGS. 1 and 2, in the dashboard 1 of a motor vehicle, a cutout 2 is provided in which a cover 3 is held by means of fastening devices 4, 5. The cover 3, in turn, has an opening 6 through which a covering sleeve 7 is partially fitted. The end of the sleeve 7 is formed by a steering wheel 8, with a pot 9. The arrangement of the components 3, 7 and 9 is selected and constructed such that, in the event of a crash, these components can collapse in a telescoping movement. Thus, mutual blocking of the parts 7, 9 on the cover 3 or on the dashboard 1 is prevented, and the sleeve 7, together with the cover 3, can move in the direction of the arrow 10 through the opening 2 in the dashboard.

For this purpose, the cover 3 has the fastening devices 4, 5 which, on the upper edge 11 of the cover 3, consist of holding angle flanges 12 with notches 13 which function as predetermined breaking points. The cover 3 is fixedly connected with the dashboard 1 by means of screws 14 (FIGS. 2, 4) while locating pins 15 are also provided in the holding angles 12. As illustrated in detail in FIG. 1, at least two holding angle flanges 12 are arranged on the upper edge 11 of the cover 3.

Figure 5:
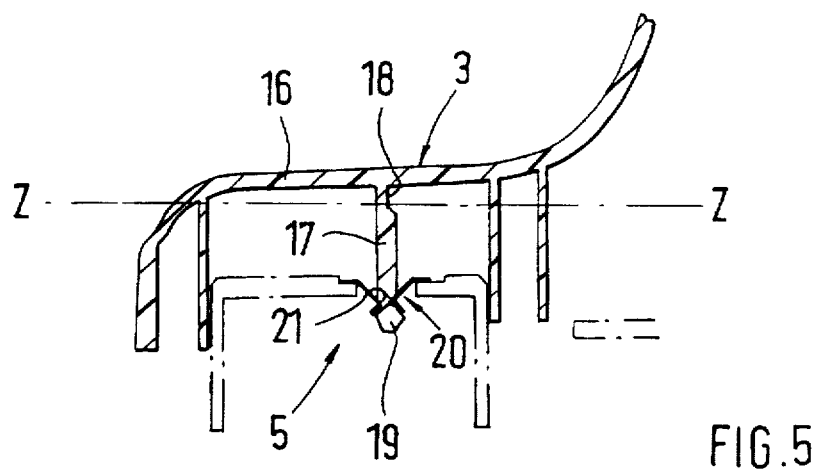
FIG. 5 is a sectional view according to Line V—V of FIG. 3 of a second fastening point.

Pins 17 serve as fastening devices on the lower edge 16 of the cover. As shown in greater detail in FIGS. 2 and 5, each pin has a notch 18 which forms the predetermined breaking point. On the free end 19, the pin 17 is held between spring clips 20 (FIG. 5), for which the pin 17 has formed-in sections 21 on both sides.

Figure 4:
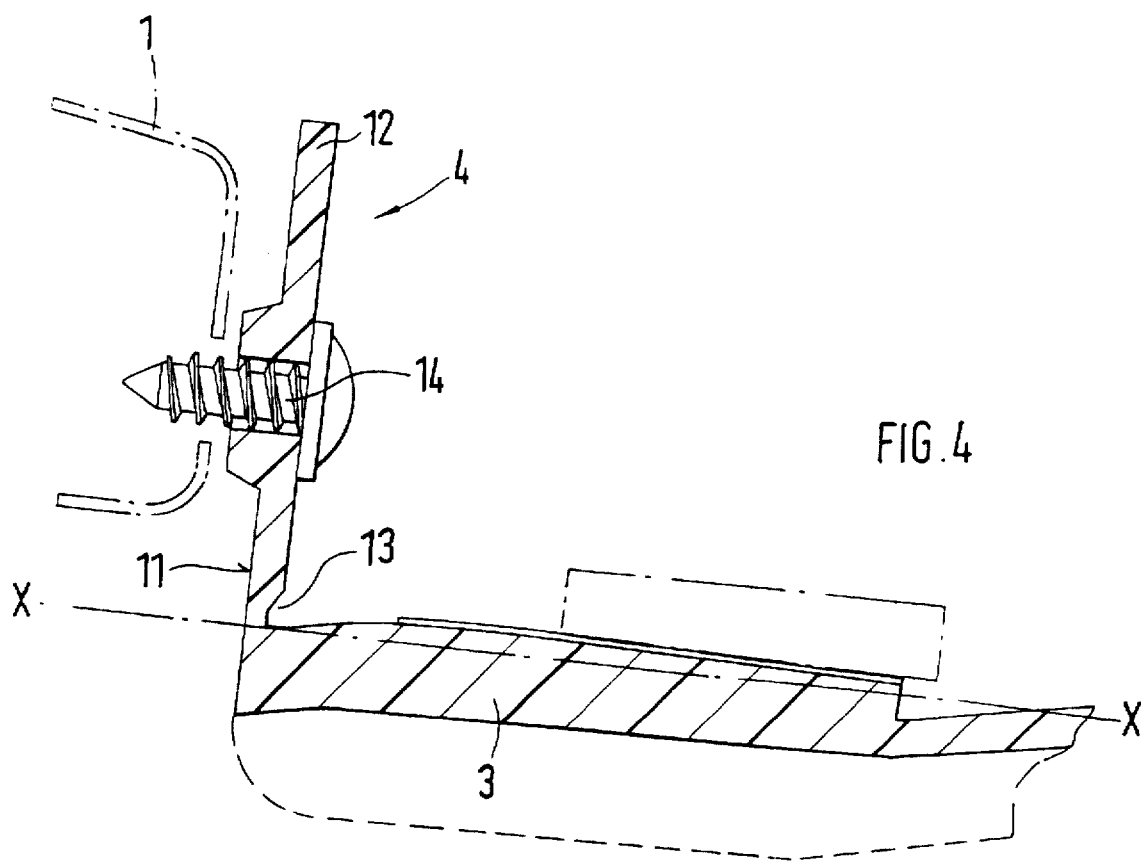
FIG. 4 is a view in the direction of the arrow Z of FIG. 1 of an upper predetermined breaking point of a first fastening device.

For easy mounting of the cover 3 in the dashboard 1, the pins 17 are first placed between the spring clips 20. Then, by a slight tilting movement of the cover 3, the holding legs 12 are placed to rest against the dashboard 1 and are fixedly connected with it by means of the screws 14, as shown in FIG. 4.

As illustrated in detail in FIG. 2, the sleeve 7 is shown in position I in an operating position (solid line). Position II (dash dot line) shows the sleeve 7 in the case of a crash, in which it is displaced in the direction of the arrow 10. Upon further displacement in the direction of the arrow 10, the sleeve 7 strikes against the cover 3, which can then detach from the dashboard 1 by means of the predetermined breaking points provided by the notches 13 in the holding angle flanges 12 and the notches 18 on the pins 17. The shearing planes X—X and Z—Z (FIGS. 4, 5) are selected such that there will be no hindering by projecting parts of the holding angles 12 and of the pins 17. In this manner, damage to the dashboard is largely avoided, and the cover can be replaced by means of a simple mounting method.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Dashboard arrangement for a motor vehicle comprising:
   a cover which surrounds a steering column of said motor vehicle and is arranged adjacent a cutout portion of a dashboard of said motor vehicle;
   a covering sleeve connected to said steering column and arranged in an opening of said cover; and
   a plurality of fastening devices arranged at opposing edges of said cover for fixedly connecting said cover to the dashboard, each of said fastening devices having at least one predetermined breaking point;

said fastening devices at a first edge of said cover comprising at least a holding flange connected to said first edge by a transition area and having a breaking point in said transition area; and said fastening devices at a second edge of said cover opposite said first edge comprising including a breaking point on the fastening device itself.

2. Dashboard arrangement for a motor vehicle according to claim 1 wherein said first edge of said cover comprises an upper edge thereof, and said second edge of said cover comprises a lower edge thereof.

3. Dashboard arrangement for a motor vehicle according to claim 1 wherein said cover is displaceable into said cutout portion of said dashboard in a forward driving direction of said motor vehicle upon breaking of said predetermined breaking points in the event of a crash.

4. Dashboard arrangement for a motor vehicle according to claim 2 wherein:

the fastening devices on the lower edge of the cover consist of at least two spaced pins which are held in a shaft at a free end thereof, between spring clips of the dashboard; and the pin shaft of each said pins has a respective predetermined breaking point at an extremity thereof.

5. Dashboard arrangement for a motor vehicle according to claim 1 wherein the fastening devices on the upper edge of the cover comprise the molded-on holding angles which are provided with a fastening screw and with a fixing pin, and the holding angle has the predetermined breaking point in the corner area in the direction of the cover.

6. Dashboard arrangement for a motor vehicle according to claim 1 wherein the predetermined breaking points on the cover are arranged such that shearing planes are obtained and, in these planes, when the covering sleeve rests against the cover, a free displacement of the cover together with the sleeve takes place into the dashboard.

7. Covering arrangement for a motor vehicle dashboard having an opening therein, through which a steering column projects; said covering arrangement comprising:

a cover which surrounds said steering column and is arranged adjacent said cutout portion;

a covering sleeve which is connected to said steering column and projects through an opening of said cover;

a plurality of holding flanges detachably connected to a first edge of said cover by means of a predetermined breaking point at a transition area of said holding flanges and said first edge, said holding flanges being adapted for attachment to said vehicle dashboard; and a plurality of holding pins detachably connected to a second edge of said cover opposite said first edge by means of a predetermined breaking point at a transition area of said holding pins and said second edge, said holding pins being adapted for attachment to said vehicle dashboard.

8. Dashboard arrangement for a motor vehicle according to claim 7 wherein:

said first edge of said cover is an upper edge thereof; and said second edge of said cover is a lower edge thereof.

9. Dashboard arrangement for a motor vehicle according to claim 8 wherein:

said holding flanges are adapted to be fixedly attached against a surface of said motor vehicle dashboard;

said holding pins have an extremity which is adapted to engage with an opening in said dashboard by means of a holding clip.

* * * * *